Feb. 17, 1959  J. T. HAZAK  2,873,581
MARINE PLATFORM
Filed Aug. 16, 1954  7 Sheets-Sheet 1
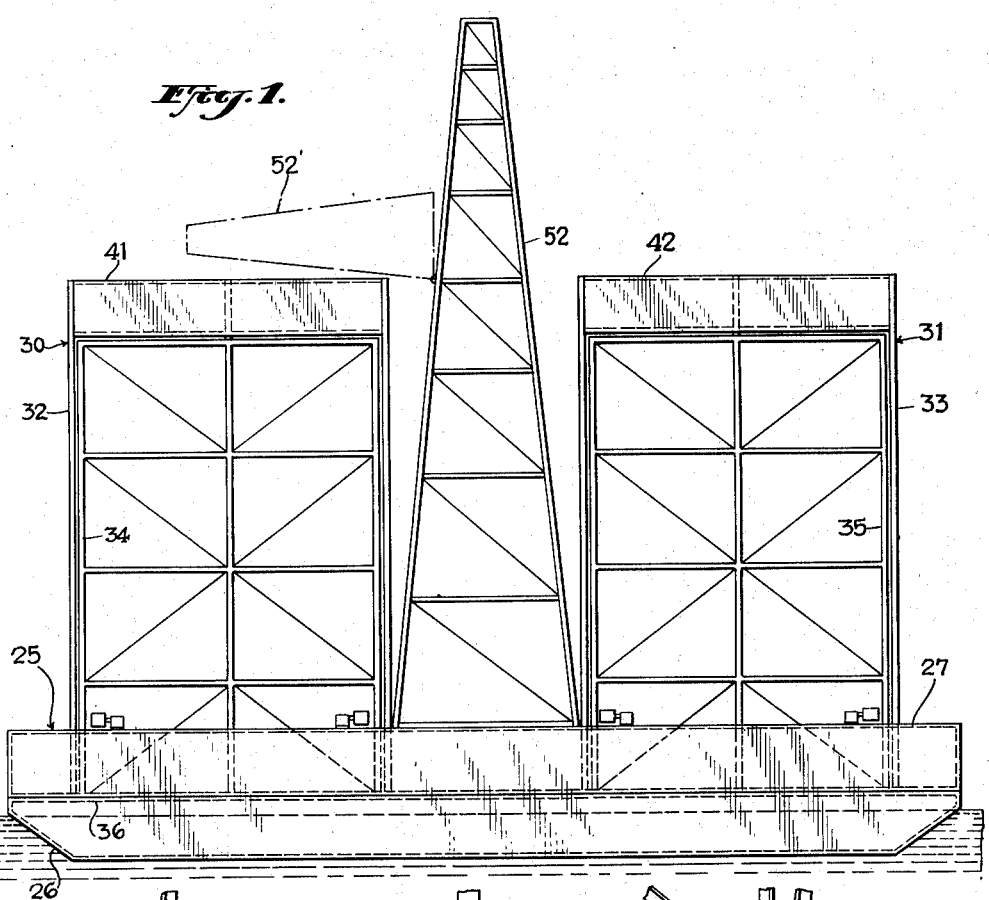
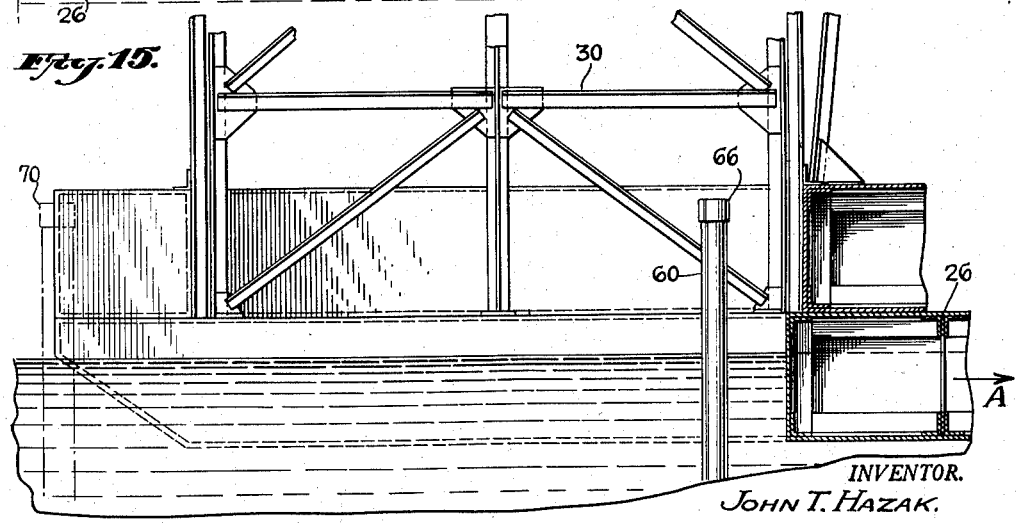
INVENTOR.
JOHN T. HAZAK.
BY
*Ward Neal Haselton Orme & McElhannon*
ATTORNEYS.

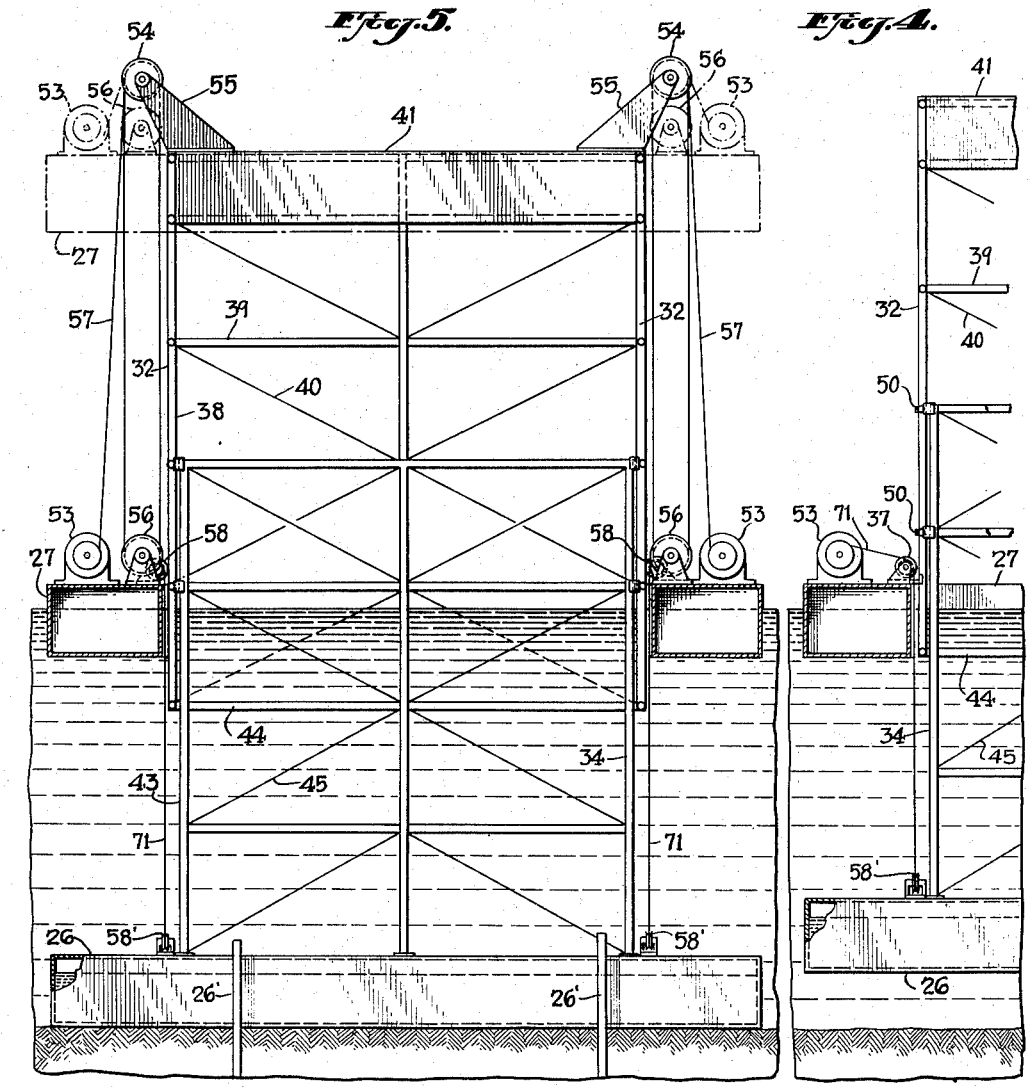

Feb. 17, 1959  J. T. HAZAK  2,873,581
MARINE PLATFORM
Filed Aug. 16, 1954  7 Sheets-Sheet 4
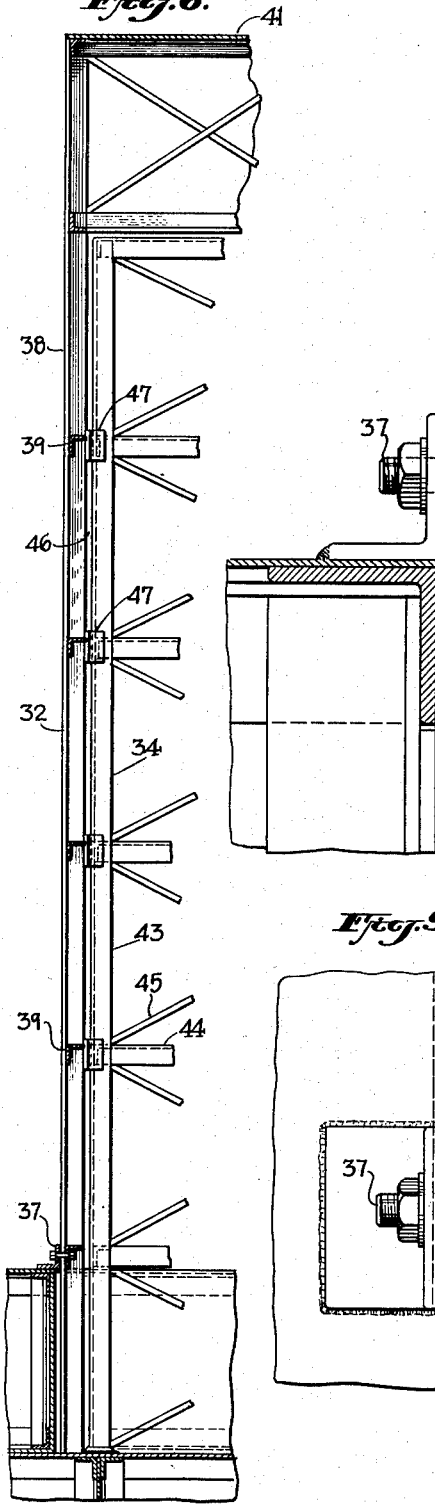
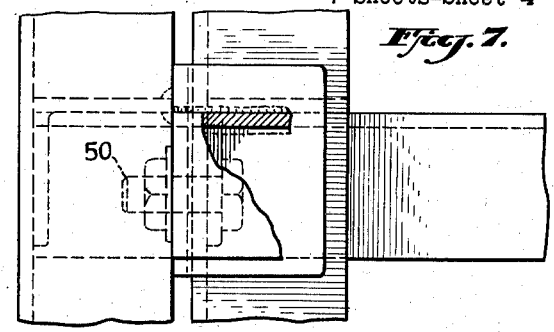
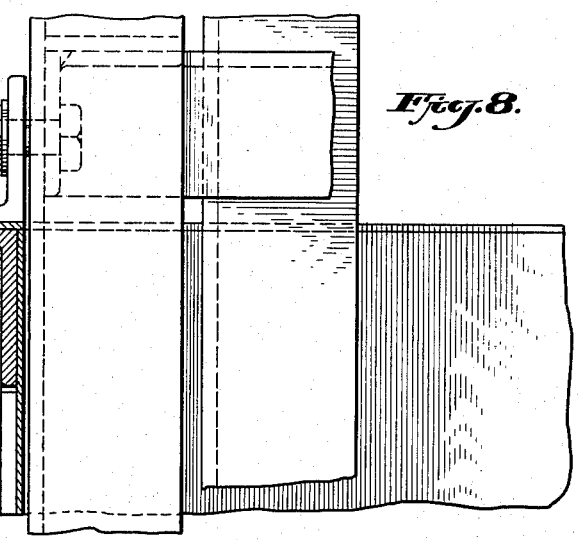
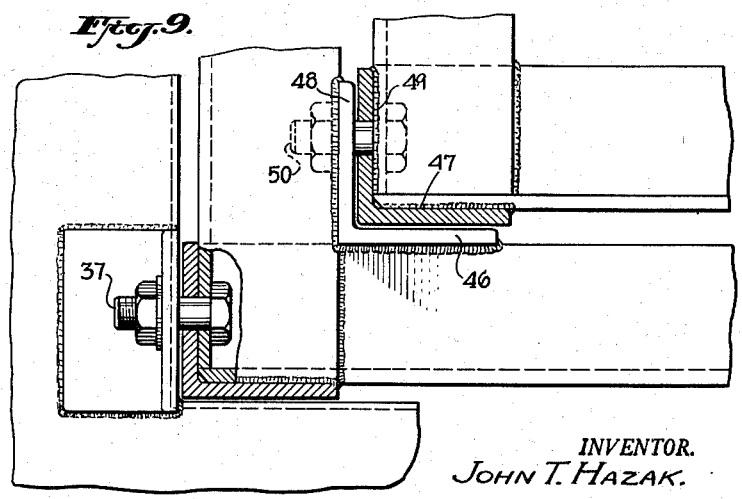
INVENTOR.
JOHN T. HAZAK.
BY
*Ward, Neal, Haselton, Orme & McElhannon*
ATTORNEYS.

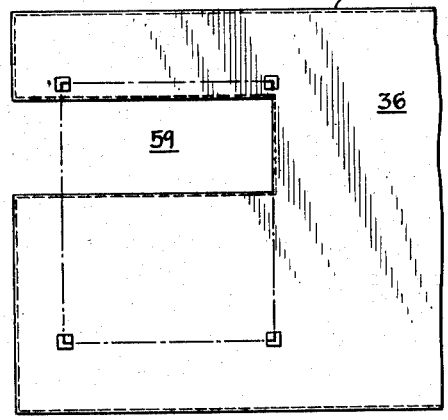
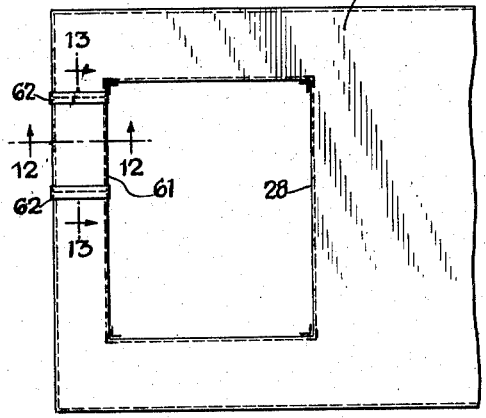
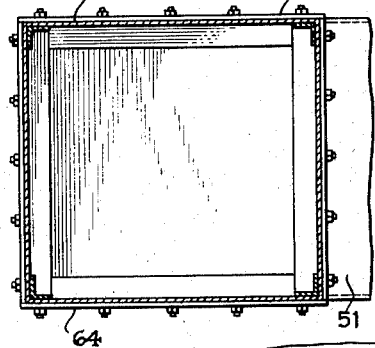
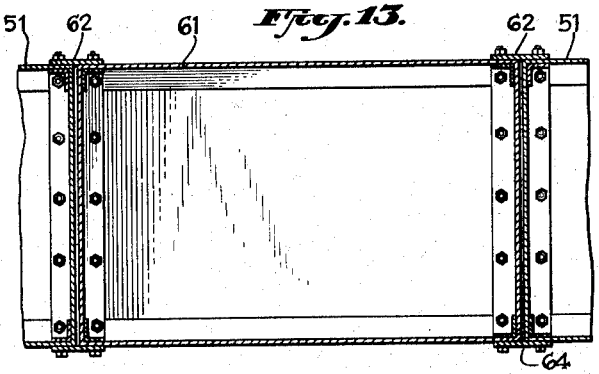
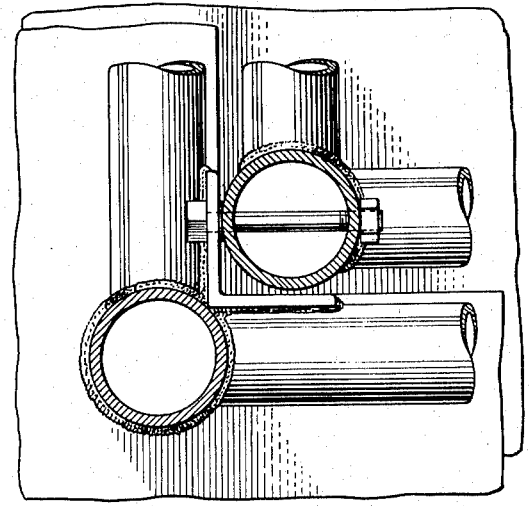
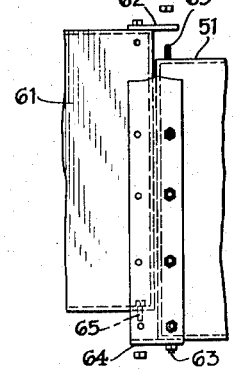
INVENTOR.
JOHN T. HAZAK.

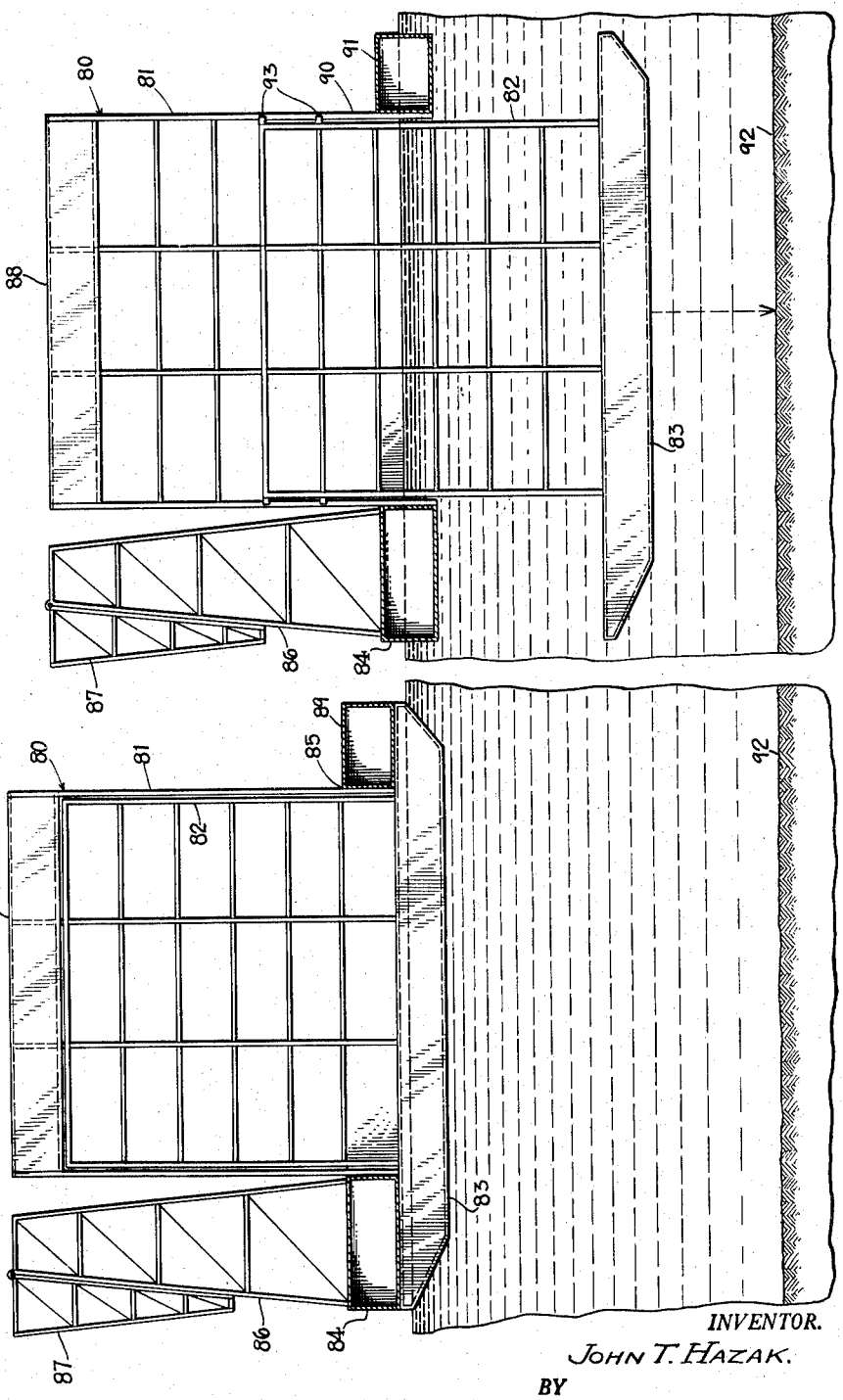

Feb. 17, 1959 J. T. HAZAK 2,873,581
MARINE PLATFORM
Filed Aug. 16, 1954 7 Sheets-Sheet 7
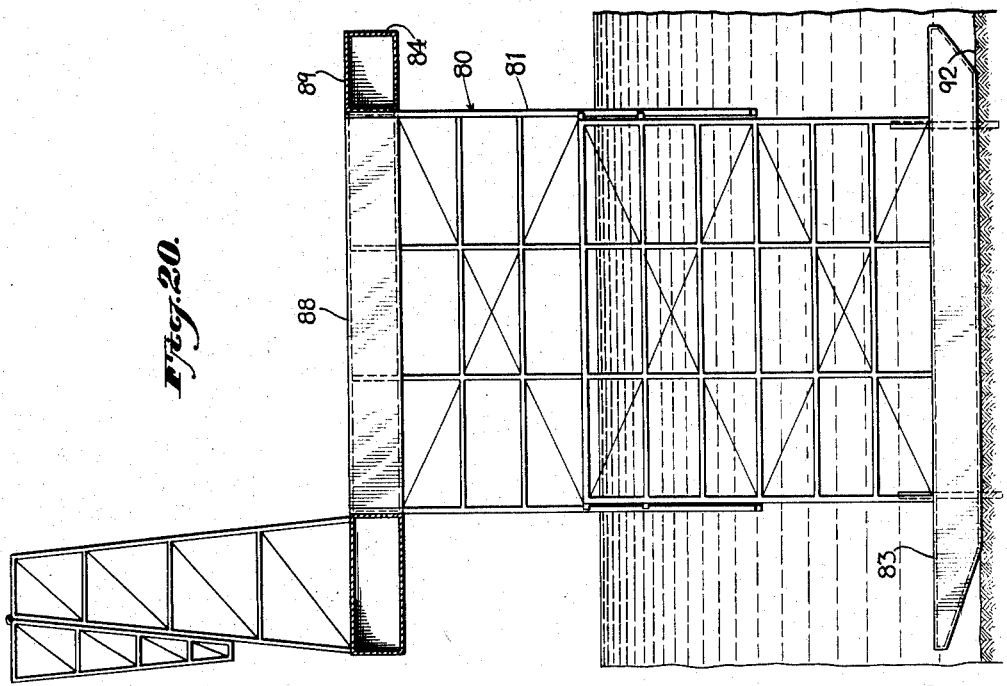
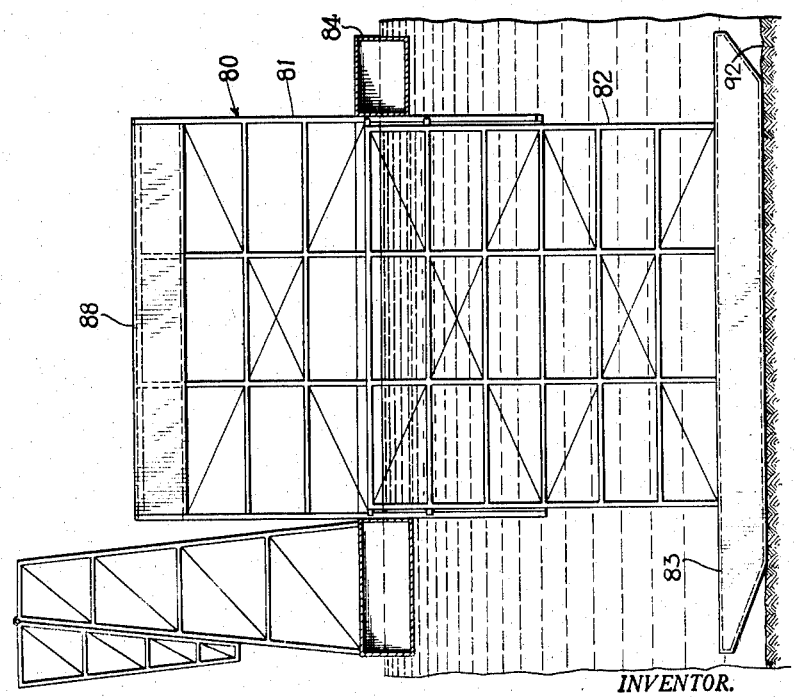
INVENTOR.
JOHN T. HAZAK.
BY
Ward, Neal, Haselton, Orme & McElhannon
ATTORNEYS.

United States Patent Office 2,873,581
Patented Feb. 17, 1959

2,873,581

MARINE PLATFORM

John T. Hazak, New York, N. Y., assignor to Raymond International Inc., a corporation of New Jersey Application August 16, 1954, Serial No. 449,998

5 Claims. (Cl. 61—46.5)

This invention pertains to mobile marine platforms of the type which find particular utility in off-shore oil well drilling operations.

Marine platforms which are mobile and carry with them the means necessary to anchor the platform at the desired off-shore location are well known at the present time. While of many and varied constructions, these platforms generally are supported in operative position by means of a plurality of cylindrical spuds or columnar structures which are anchored in the sea bottom and rise vertically therefrom to the platform. These spuds or columnar structures are necessarily inherently structurally weak unless of considerable dimensions and weight, since the platforms are designed for use in water up to depths of 100 feet. In order to avoid cumbersome and space-consuming hoisting equipment, it has been a practice to support them in wells in vertical positions extending upwardly from the platform prior to towing the same to the desired sea location. Obviously during such towing operations the stability of such a platform will be far from satisfactory since such vertical positioning of the spuds tends to raise substantially the center of gravity of the platform thereby making its seaworthiness a problem of considerable magnitude. Moreover, even when such spuds or columnar units are dropepd to the seat bottom so as to anchor the platform, the upper portions thereof still extend above the working deck of the platform itself thereby causing undesirable obstructions in the work area, the height of such obstructions depending of course upon the depth of water at the particular anchorage location.

These and other disadvantages inherent in the mobile marine platforms of the type presently known can be eliminated with the present invention. The present invention contemplates a mobile marine platform which comprises an anchorage barge operatively associated with a facilities barge by means of a telescoping tower support structure which is inherently structurally strong, stiff and light. This facilities barge carries a movably mounted oil well derrick of well-known construction. In the mobile condition of the platform the anchorage barge, being normally buoyant, floats on the surface of the water and supports the facilities barge so that the two are adapted to be towed as a single unit to the chosen drilling location. When it is desired to anchor the platform in position for drilling, the anchorage barge is flooded with water thereby causing the same to submerge until it comes to rest on the sea floor. In this position the facilities barge floats on the surface of the water and is held stationary there, by means of the telescoping tower support structure, which latter consists of two or more sections, normally telescoped into nested relationship when the barge is in the mobile condition but designed to telescope gradually out of said nested relationship and extend between the anchorage barge and the facilities barge when the former is submerged, thereby constituting a continuous rigid support for the latter.

Each tower structure is of course designed so that its fully extended length will at least equal the depth of water in which drilling operations are to be carried out, plus the desired height of the working deck space above the surface of the water. In the mobile condition of the platform each tower extends upwardly through vertical wells provided in the facilities barge. However, since the sections of each tower are in nested relationship at this time, the overall height of the tower above the deck of that barge can be limited to approximately one-half or less the estimated distance between the working deck space and the sea bottom at the drilling location. The top of the upper section of each tower is provided with a platform which, in conjunction with the deck of the facilities barge, is adapted to constitute a working deck space. Thus, when the anchorage barge is submerged, the tower sections telescope outwardly with respect to each other permitting the facilities barge to float on the surface and then the upper tower sections can be adjusted so that the platform of each tower is located at a height above said water surface which corresponds to the desired height of the working deck space for the drilling operation. Power winches or other generally equivalent known hoisting means (all referred to herein as winch means, for convenience) are provided on these tower platforms and by means of the same the facilities barge can be raised up to a level above the water surface so that its deck will be flush with the platforms, thereby providing a working deck space for drilling operations.

Such a platform provides a maximum of stability in both the mobile and anchored positions. The towers are easily made of large horizontal cross-section and can be rigidly braced thus making them suitable for use in deep water and to resist great forces. The arrangement is capable of use in water of varying depths to upwards of 100 feet, and yet, by virtue of the telescopic tower supports, the overall height of the platform in the mobile condition need not be much more than one-half of the distance from the operating level of said platform to the sea bottom, and may of course be much less by using a greater number of telescoping tower sections. Furthermore, this type platform provides a working deck space which is unobstructed by protruding portions of its supporting structure. Moreover, as will be described hereinafter, such a platform lends itself to be provided with means which permits the same to be moved from one drilling location to another without disturbing the necessary oil well pipe of the first installation. In the lowering or raising of the anchorage barge, the movement can be controlled either by the winch or other hoisting equipment, or by buoyancy, or both.

Other and more specific objects, features and advantages of the invention will appear from the detailed description given below, taken in connection with the accompanying drawings which form a part of this specification and illustrate by way of example the presently preferred embodiments of the invention.

In the drawings:

Fig. 1 is a side elevational view of a mobile marine platform according to the invention, showing the anchorage barge, facilities barge and telescoping tower structures in position for flotation to or from the desired off-shore location.

Fig. 4 is an enlarged partial elevational view showing the relationship of the tower sections to the barges when the anchorage barge is being lowered to the sea bottom.

Fig. 5 is an enlarged side elevational view showing in full lines the position of the facilities barge when the anchorage barge has been submerged to the sea bottom and in dotted lines the position of the facilities barge when when raised above the surface of the water.

Fig. 6 is an enlarged fragmentary elevational view showing the telescoping relationship of the tower sections in the mobile condition of the platform.

Fig. 7 is an enlarged fragmentary view showing the means for attaching the upper tower section to the lower section.

Fig. 8 is a view similar to Fig. 7 but showing the means for attaching the upper tower section to the facilities barge.

Fig. 9 is an enlarged fragmentary horizontal sectional view showning the attachment means of both Figs. 7 and 8.

Fig. 10 is a top plan view of the anchorage barge showing the cut-out tunnel which permits removal of the platform to another location without disturbing the existing well pipe or casing.

Fig. 11 is a top plan view of the facilities barge showing the removable section which is normally aligned with cut-out tunnel of the anchorage barge.

Fig. 12 is an enlarged sectional view taken on line 12—12 of Fig. 11.

Fig. 13 is an enlarged sectional view taken on line 13—13 of Fig. 11.

Fig. 14 is fragmentary elevational view showing the manner in which the removable section of the facilities barge is installed.

Fig. 15 is a fragmentary sectional view showing the relationship of the cutaway portions of the barges to the oil well pipe which permits the platform to be moved without disturbing the pipe.

Fig. 16 is a fragmentary horizontal section showing the means for attaching upper and lower sections of a modified form of tower construction.

Fig. 17 is a schematic side elevation of a modified form of platform showing the parts thereof in the mobile condition.

Fig. 18 is a schematic view similar to Fig. 17 but showing the anchorage barge in the midway position.

Fig. 19 is a schematic view similar to Fig. 17 but showing the anchorage barge at rest on the ocean floor; and Fig. 20 is a schematic view similar to Fig. 17 but showing the platform in the operating condition.

Figure 2:
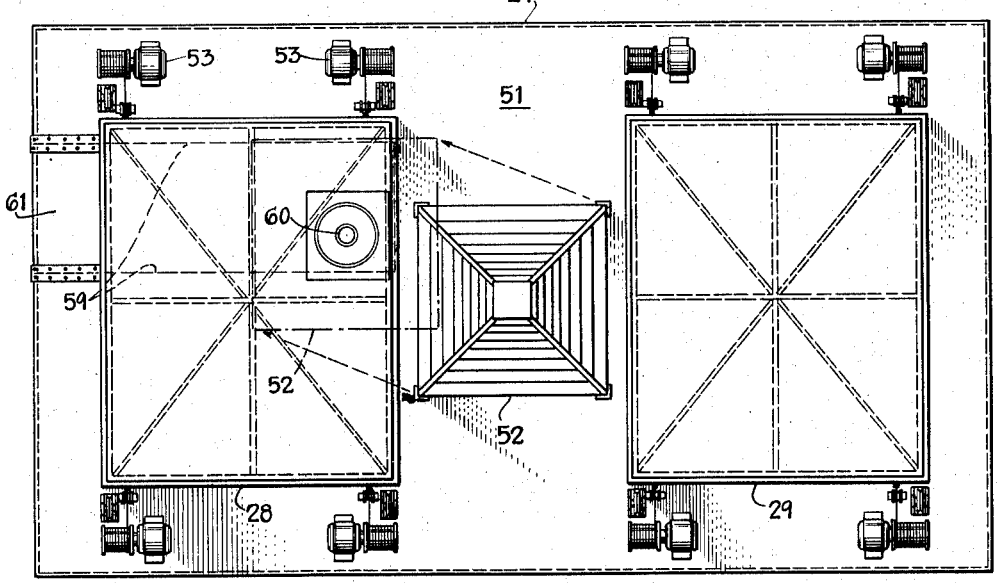
Fig. 2 is a top plan view of the structure of Fig. 1.

Referring now in more detail to the drawings, and particularly to Figs. 1 to 5 thereof, there is shown a mobile marine platform 25 according to one embodiment of the invention. In the mobile condition, this platform comprises a buoyant anchorage barge 26, which is designed to float on the surface of the water and a facilities barge 27, also buoyant, is carried by said anchorage barge. These barges 26, 27 may be constructed in any well-known fashion but as shown are comprised of metal plates welded or otherwise suitably secured together to form hollow compartments designed to provide buoyancy. The facilities barge is provided with wells 28 and 29 which extend vertically therethrough and are designed to receive telescoping tower support structures 30 and 31. These towers are comprised of upper sections 32, 33 and lower sections 34, 35. These lower tower sections are suitably secured to and supported by a deck 36 on the anchorage barge and extend upwardly therefrom nesting within the upper tower sections 32, 33 respectively. When the platform is in the mobile condition, the upper tower sections 32, 33, on the other hand, are normally secured near their lower ends to the deck of the facilities barge by means of bolts 37 (see Fig. 6).

As shown in Figs. 5 to 9, each of the upper tower sections may be formed of a plurality of upright angle members 38, made of suitable structural material, a plurality of horizontal angle braces 39 connected at spaced intervals to the upright members 38 and a plurality of diagonal braces 40 which interconnect the vertical and horizontal angle members so as to form a rigid structural unit. Suitably mounted on top of these upper tower sections are platforms 41, 42 which are designed to cooperate with the facilities barge in a manner to be described hereinafter and thereby constitute a working deck space when the marine platform is in the anchored or operating position. The lower tower sections 34, 35 are similarly constructed, having upright angle members 43, horizontal cross-braces 44 and diagonal braces 45. As can be readily observed there lower tower sections are designed to telescope into and out of nesting relationship with the upper tower sections. To accomplish this telescoping or sliding relation, the upper tower sections are provided with vertically extending rubbing plates 46 (Fig. 9) which cooperate with angle plates 47, the latter being secured to the lower tower sections at those points where the horizontal angle members 44 are joined to the vertical angle members 43. For convenience, the junctures of these members at which points angle plates 47 are located will be referred to hereinafter as panel points. At each of these panel points the angle plates 47 are provided with holes 48 which, when aligned with similar holes 49, provided at suitable vertically spaced intervals on the rubbing plates 47, are adapted to receive bolts 50, designed to secure the upper and lower tower sections relative to each other. The particular procedure of attaching these sections to one another during the operation of the platform will be fully set forth hereinafter.

Referring now to Fig. 2, it will be seen that the facilities barge 27 has a deck 51 which surrounds wells 28 and 29. This deck space is used in the mobile condition of the platform to support an oil well derrick 52 which is of well-known construction and which for purposes to be described hereinafter is movably mounted on the deck 51. It should also be noted that this derrick is provided with a hinged upper section 52' which is adapted to pivot to the position shown in dotted lines in Fig. 1 when not in use, thereby reducing the overall height of the structure, and hence improving its stability in the mobile condition. Power winches 53 of well-known type are located on this deck of the facilities barge at convenient locations adjacent the wells 28 and 29. As is best seen in Fig. 5, hoisting blocks 54 are provided on the platforms 41, 42 of the upper tower sections and are positioned so as to overhang the edges of said platforms by means of angularly extending flanges 55. Other blocks 56 are mounted on the deck of the facilities barge directly beneath the overhanging blocks 54. Facilities barge hoisting cables 57 are suitably rigged, running through blocks 54 and 56, and may be attached to the power winches 53 so that when the mobile platform is in the anchored position, upon operation of these winches, the facilities barge can be raised up off the surface of the water. Separate sets of hoisting blocks, as at 58 and 58', are provided on the facilities barge and anchorage barge respectively, with anchorage barge hoisting cables 71 rigged so as to run therethrough, and adapted to be connected to the power winches 53 when it is desired to raise or lower said anchorage barge from or to the seat bottom, as will be described more fully hereinafter.

Figure 3:
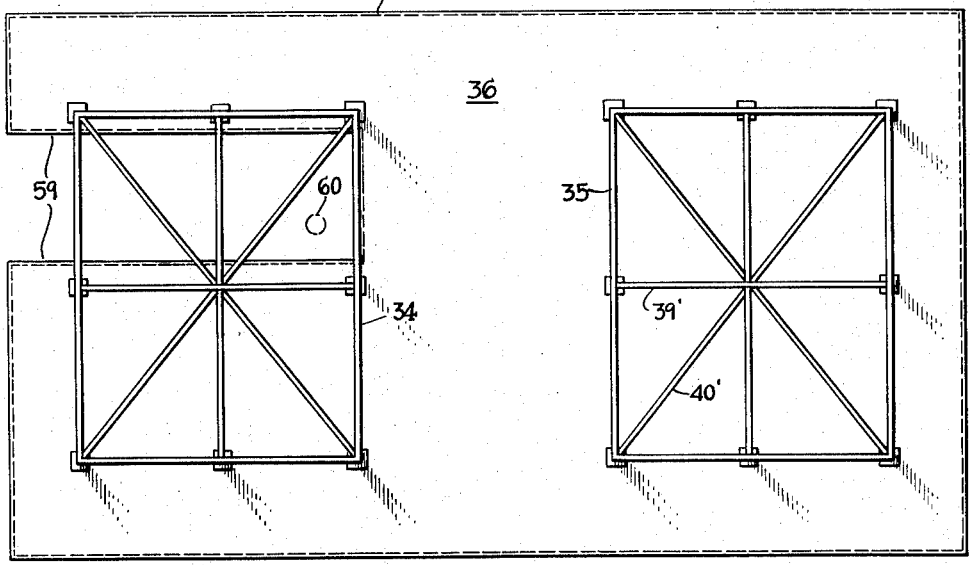
Fig. 3 is a top plan view of the submersible barge of Fig. 1 showing the lower sections of the tower structures mounted thereon.

Referring now to Figure 3, it will be noted that the anchorage barge 26 is provided with a tunnel or a cutaway portion 59 which extends inwardly from the side thereof to a point just beyond the lower section 34 of the tower support structure 30. The function of this tunnel is to permit removal of the barge from one drilling location to another without disturbing the normal oil well pipe 60. As shown in Fig. 2, when the platform is in the mobile condition with the facilities barge carried by the anchorage barge, tunnel 59 is disposed directly beneath a portion of vertical well 28 and thus a space is provided extending entirely through both barge structures and designed to permit the passage of oil well pipe 60. The facilities barge is provided with a removable section 61, positioned so as to vertically overlie the anchorage barge tunnel 59. Shown in detail in Figs. 11–14, it consists simply of a buoyant, rectangular tank-like member which is provided at each of its extremities with connecting bars 62 which are suitably apertured to receive bolts 63 provided on the deck of the facilities barge. Similarly the facilities barge is provided on its lower surface with connecting bars 64 suitably apertured to receive bolts 65 provided on the removable section 61. As shown in Fig. 14, this section 61 is designed to slide into and out of engaging relationship with the facilities barge, thereby providing when thus engaged a continuation of the barge deck 51 and when removed a cutaway portion communicating with well 28 and designed to cooperate with tunnel 59 of the anchorage barge so as to permit sidewise passage of oil well pipe 60.

When the barge has been anchoraged in the desired off-shore location, the oil well derrick 52, is moved to the dotted line position shown in Fig. 2 and the oil well pipe 60 sunk in the normal manner. Referring now to Fig. 15, when it is desired to move the platform to a new drilling location, the anchorage barge is brought to the surface in a manner to be described hereinafter and oil well 60 is capped as shown at 66. Section 61 of the facilities barge is then removed by disconnecting bolts 63, 65 and lifting the same vertically out of position. The platform is then towed in the direction of arrow A, Fig. 15, thereby permitting the pipe 60 to pass out from underneath the tower structure 30 sidewise through clearance space provided by tunnel 59, well 28 and the space where section 61 normally rests, until finally the pipe has moved relative to the platform to the dotted line position shown at 70, whereupon the platform is free to be towed to the next desired location.

The mode of operation of the mobile platform of the invention may be understood by reference to Figs. 1, 4 and 5. As shown in Fig. 1, the platform is in the mobile condition and when in this condition may be towed to the described off-shore drilling location. In this condition, the lower tower sections are merely nested within the upper tower sections and are free to slide relative thereto. Because of this nested relationship of the tower sections, it will be obvious that the overall height of each tower above the deck of the barge can be limited to approximately one-half or less the estimated distance between the working deck space and the sea bottom at the drilling location. When two tower sections are used as is shown here, it is obvious that each section must have a height equal to at least half the aforementioned distance. However, if three or more nesting sections per tower are utilized, it is obvious that for a given operating depth of water such sections may be of lesser height. In other words, by increasing the number of tower sections the overall height of each tower above the deck of the barge when the platform is in the mobile condition, can be proportionately lessened. When the desired destination has been reached, the interior of the anchorage barge 26 is flooded with water, as by any suitable pipe connections (not shown), so as to provide that member with a negative buoyancy which permits the same to sink to the sea bottom. Prior to flooding the anchorage barge, the hoisting cables 71 are operatively connected to power winches 53, and therefore after the barge has been flooded its rate and degree of descent may be controlled by said winches. By releasing the winches, the cables 71 may be slowly payed out thereby permitting the anchorage barge to submerge to a depth such as is shown in Fig. 4. During this partial descent of the anchorage barge, the lower tower sections 34, 35 will, of course, have moved partially down out of nesting relationship with the upper tower sections 32, 33, since the latter have been held fast by the bolts 37 to the facilities barge. It will be desired, of course, to control this movement between the tower sections to conform to the depth of water at the particular location involved. Thus when operating in relatively deep water, it will be necessary to permit the tower sections to telescope almost completely out of nesting relationship, but on the other hand in shallow water the desired degree of outward telescoping movement of these sections will be obviously much less. Not only the depth of the water involved but also the dimensions of the tower sections themselves will, of course, weigh in this determination. Thus, after the necessary calculations have been made in the light of these factors, and the anchorage barge has submerged to a level sufficient to have caused the calculated degree of outward telescopic movement between the tower sections, it will be desired to halt the descent of the anchorage barge momentarily in order to adjust the connections between the tower sections and thereby prevent further outward telescopic motion between the same. As has been mentioned above, the rubbing plates 46 of the upper tower sections are provided at vertically spaced intervals with bolt receiving holes and similarly the panel points on the lower tower sections are also provided with such holes. Thus, if the winches 53 are locked at a time when one of these panel point holes is horizontally aligned with one of the rubbing strip holes, by inserting bolts 50 as shown in Fig. 4, the tower sections can be secured together against further telescopic movement. When this has been accomplished, the outer tower section is then freed relative to the facilities barge by disconnecting bolts 37. Thereupon the cables 71 are again payed out by winches 53 in order to permit the anchorage barge to continue its descent to the sea bottom. During this portion of the anchorage barge's descent, it will be observed by reference to Fig. 5 that both upper and lower tower sections move downwardly therewith until the barge comes to rest on the sea bottom. In this position, the anchorage barge constitutes a firm anchor for the platform. Of course, if it is contemplated that a severely sloping sea bottom will be encountered, a sectional anchorage barge can be employed, with each section having a tower. Moreover, in any event, once the anchorage barge is in position on the bottom it may be more firmly secured in that position by driving any suitable type of spuds 26' or the like into said bottom at points adjacent the barge edges or through openings therein.

By then connecting the facilities barge hoisting cables 57 to the power winches 53 and taking up on those winches, it will be evident that the facilities barge itself can be raised above the surface of the water until its deck is flush with the platforms 41, 42 on the upper tower sections as shown in the dotted line position in Fig. 5. In this position, the mobile platform is ready for operation and the oil well drilling derrick may be moved over the vertical well 28 for drilling in the manner previously described. After drilling is completed and it is desired to move the barge to a new location, the facilities barge may of course be lowered to the surface of the water by slacking off on cables 57. The anchorage barge is provided with suitable automatic pumping equipment (not shown) of well-known type so that, when desired, it may be pumped out, thereby returning its original buoyancy and permitting it to float to the surface. During this operation, the tower sections are again brought into nested telescopic relation by operations generally the reverse of those taken in lowering the anchorage barge. As it floats to the surface, the anchorage barge will of course lift the facilities barge out of the water thereby returning the platform to the mobile condition shown in Fig. 1.

Referring now to Figs. 17 to 20 inclusive, another embodiment of the mobile platform is therein schematically shown. Basically, it differs from the previous embodiment only by virtue of the fact that it is equipped with only one telescoping tower structure 80. As in the previous embodiment, this tower construction comprises an upper section 81 and a lower section 82 which in the mobile condition of the platform are in the nested relationship shown in Fig. 17. The lower section 82 is mounted on an anchorage barge 83 which latter is normally buoyant but is capable of being submerged by flooding the hollow interior of the same. The lower end of the upper section 81 of the tower structure is in turn bolted to the deck of anchorage barge 83 when the platform is in the mobile condition. A facilities barge 84, provided with a vertically extending well 85, adapted to permit the passage of the tower sections therethrough, supports an oil well derrick 86 having one or more hinged upper sections as at 87. A platform 88 is provided on the top of the upper tower section 81 and is designed to cooperate with the deck 89 of the facilities barge when the latter is raised above the surface of the water thereby constituting a working deck space.

Fig. 17 shows this modified form of mobile platform with the parts thereof in position for towing to the desired off-shore location. In Fig. 17, the anchorage barge is shown midway in its descent to the sea bottom 92. As was the procedure in connection with the embodiment of Fig. 1, when the lower tower section 82 has telescoped far enough out of nesting relationship with the upper tower section 81, this downward movement of the anchorage barge is momentarily halted and the tower sections secured together by means of bolts indicated at 93. The upper tower section 81 is then released relative to the facilities barge and the anchorage barge is permitted to descend the remaining distance to the sea bottom. As shown in Fig. 19, when the anchorage barge reaches the sea bottom both the upper and lower tower sections will have been pulled down relative to the facilties barge. However, the tower platform 88 will still be positioned at a distance above the facilities barge. As described above in connection with the embodiment of Fig. 1, the facilities barge 84 may then be raised on the tower structure to a level above the surface of the water so that its deck 89 becomes flush with the surface of the tower platform 88 thereby constituting a working deck surface as shown in Fig. 20.

Although certain particular embodiments of the invention are herein disclosed for purposes of explanation, various further modifications thereof, after study of this specification, will be apparent to those skilled in the art to which the invention pertains. Reference should accordingly be had to the appended claims in determining the scope of the invention.

What is claimed and desired to be secured by Letters Patent, is:

1. A mobile marine platform comprising in combination a buoyant facilities barge and a normally buoyant anchorage barge positioned therebelow, said anchorage barge being adapted to be flooded with water and thereby caused to sink to the sea bottom when it is desired to anchor the platform and also adapted to be emptied of water and thereby caused to rise to the surface when it is desired to move the platform to a new location, telescoping tower support means interconnecting said barges, said telescoping tower support means comprising a plurality of sections which are adapted to nest within each other when the platform is in the mobile condition, connection means for securing one section to the facilities barge as the anchorage barge sinks to the sea bottom whereby another section secured to the anchorage barge telescopes at least partially out of such nesting relationship, said facilities barge having sufficient buoyancy to support the section secured thereto, means for securing said sections together when the desired degree of telescopic movment has been achieved, said connection means between the one section and the facilities barge being releasable when desired, whereby continued downward movement of the anchorage barge will cause the sections to move downwardly with respect to the facilities barge and form a continuous rigid support extending upwardly from said anchorage barge to the facilities barge, platform means provided at the top of said tower support means, and means connected to the facilities barge and to the tower support means for raising the facilities barge above the surface of the water to the level of said tower platform means so as to thereby form therewith an elevated working deck space.

2. A mobile marine platform comprising a buoyant facilities barge having vertical well means extending therethrough and a deck surrounding said well means, a normally buoyant anchorage barge positioned beneath the facilities barge, said anchorage barge being adapted to be flooded and thereby caused to submerge to the sea bottom when it is desired to anchor the platform in operative position, tower support means interconnecting said barges and comprising a plurality of sections which are adapted to nest within one another and extend upwardly through the well means of the facilities barge when the anchorage barge is on the surface, the outer section being secured to the facilities barge and the inner section being secured to the anchorage barge, whereby when the anchorage barge submerges, the inner section will begin to telescope out of nesting relationship with the outer section, said facilities barge having sufficient buoyancy to support the outer section, means for securing said sections together and means for releasing said outer section from the facilities barge when the desired degree of telescopic movement therebetween has been achieved, whereby both sections are free to move downwardly with the anchorage barge and thereby form a continuous support between the barges when the anchorage barge is submerged, platform means provided on the top of said tower means and winch means connected by cables with the facilities barge and tower means, whereby, when the anchorage barge is on the sea bottom, the facilities barge can be raised above the surface of water until its deck corresponds in level to that of the platform means thereby constituting a continuous working deck space.

3. A mobile marine platform comprising in combination a buoyant facilities barge and an anchorage barge positioned therebelow, said anchorage barge being normally buoyant but adapted to be flooded with water and thereby sink to a position of rest on the sea bottom, telescoping tower support means interconnecting said barges, said telescoping tower support means comprising a plurality of sections which are adapted to nest within each other when the platform is in the mobile condition, connection means for securing one section to the facilities barge as the anchorage barge sinks to the sea bottom whereby another section secured to the anchorage barge telescopes at least partially out of such nesting relationship, said facilities barge having sufficient buoyancy to support said one section, means for securing said sections together when the desired degree of telescopic movement has been achieved, said connection means between the one section and facilities section barge being releasable when desired, whereby continued downward movement of the anchorage barge will cause the sections to move downwardly with respect to the facilities barge and form a continuous rigid support extending upwardly from said anchorage barge to the facilities barge, platform means provided on the top of said tower support means and winch means connected to the facilities barge and tower means by cables whereby the facilities barge can be raised above the surface of the water.

4. A mobile marine platform comprising in combination a facilities barge, an anchorage barge positioned therebeneath, and telescoping tower support means comprising a plurality of sections interconnecting the barges, connection means for securing one section to the facilities barge when it is desired to permit telescopic movement between said sections, the facilities barge having sufficient buoyancy to support said one section, and means for locking said one section relative to said other section when the desired degree of telescopic movement has been achieved, said facilities barge having a deck provided with well means extending therethrough, the tower support means extending upwardly through said well means and provided with platform means designed to cooperate with the deck of the facilities barge when the latter is raised up off the water surface and form a continuous working deck space, an oil well derrick movably mounted on the deck of the facilities barge so as to be capable of being shifted to position on the platform means when it is desired to sink an oil well pipe which will pass down through the well means of the facilities barge, a cutaway portion provided in the anchorage barge beneath said well means and designed to permit passage of the oil well pipe, said cutaway portion extending outward to the side of the anchorage barge, and said facilities barge having a removable section aligned with the cutaway portion of the anchorage barge, whereby when it is desired to move the platform to a new location, the same may be towed away without dismantling the oil well pipe.

5. A mobile marine platform comprising in combination a buoyant facilities barge and a normally buoyant anchorage barge positioned therebelow, said anchorage barge being adapted to be flooded with water and thereby caused to sink to the sea bottom when it is desired to anchor the platform and also adapted to be emptied of water and thereby caused to rise to the surface when it is desired to move the platform to a new location, telescoping tower support means interconnecting said barges, said telescoping tower support means comprising a plurality of sections which are adapted to nest within each other when the platform is in the mobile condition, connection means for securing one section to the facilities barge as the anchorage barge sinks to the sea bottom whereby another section secured to the anchorage barge telescopes at least partially out of such nesting relationship, said facilities barge having sufficient buoyancy to support the section secured thereto, means for securing said sections together when the desired degree of telescopic movement has been achieved, said connection means between the one section and the facilities barge being releasable when desired, whereby continued downward movement of the anchorage barge will cause the sections to move downwardly with respect to the facilities barge and form a continuous rigid support extending upwardly from said anchorage barge to the facilities barge.

References Cited in the file of this patent
UNITED STATES PATENTS

| | | |
|---|---|---|
| 2,539,695 | Moon | Jan. 30, 1951 |
| 2,589,146 | Samuelson | Mar. 11, 1952 |
| 2,600,761 | Halliburton | June 17, 1952 |
| 2,603,068 | Wilson | July 15, 1952 |